Figure 1:
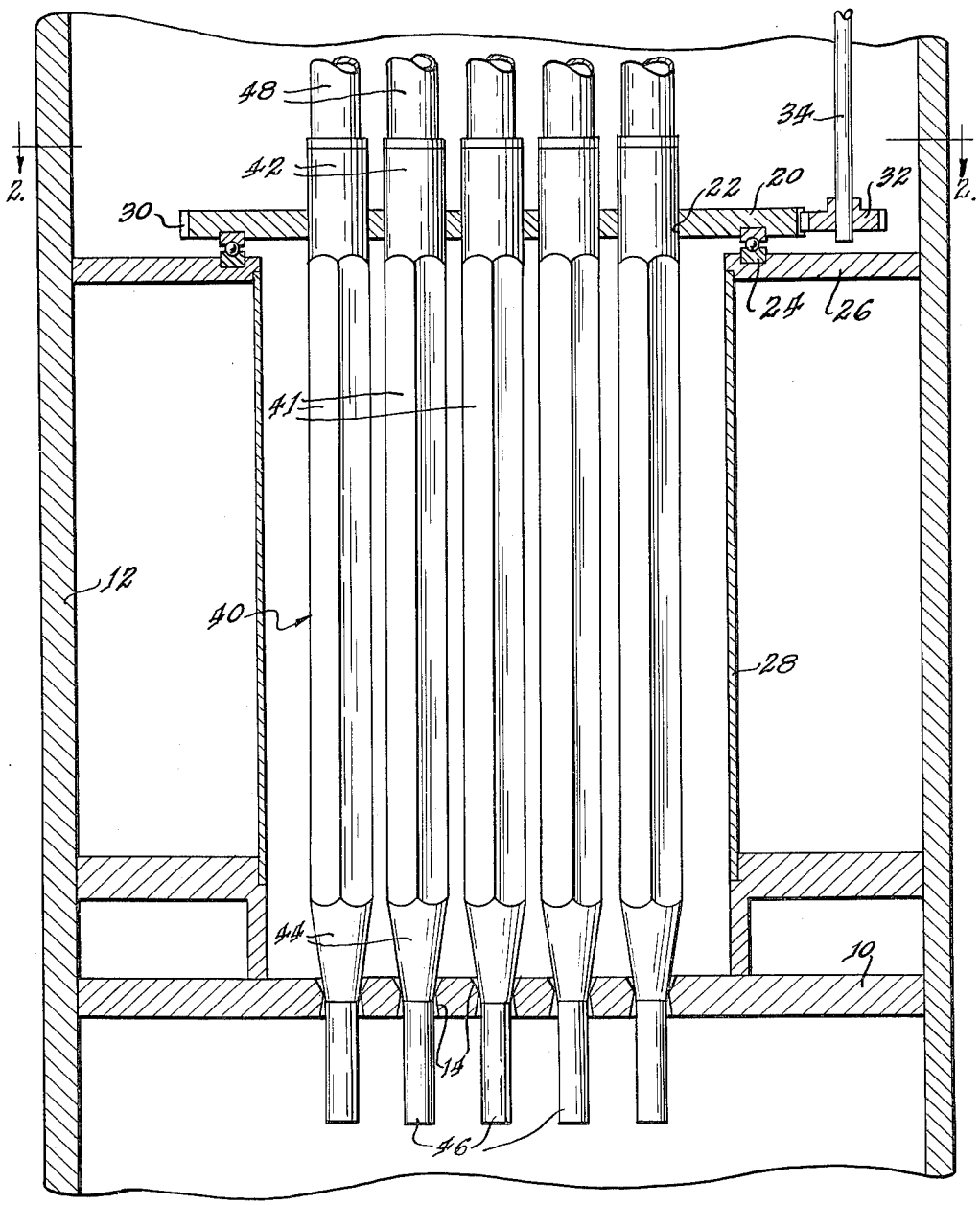

Jan. 18, 1966 E. R. ASTLEY ETAL 3,230,146
CORE HAVING MEANS FOR VARYING INCLINATION OF FUEL ASSEMBLIES
Filed Dec. 24, 1964 3 Sheets-Sheet 2

INVENTORS
Eugene R. Astley
Lester M. Finch
By:
Attorney

Jan. 18, 1966     E. R. ASTLEY ETAL     3,230,146
CORE HAVING MEANS FOR VARYING INCLINATION OF FUEL ASSEMBLIES
Filed Dec. 24, 1964     3 Sheets-Sheet 3

INVENTORS
Eugene R. Astley
Lester M. Finch

Roland A. Anderson
Attorney

United States Patent Office 3,230,146
Patented Jan. 18, 1966

3,230,146
CORE HAVING MEANS FOR VARYING INCLINATION OF FUEL ASSEMBLIES
Eugene R. Astley, Richland, and Lester M. Finch, Pasco, Wash., assignors to the United States of America as represented by the United States Atomic Energy Commission
Filed Dec. 24, 1964, Ser. No. 421,134
3 Claims. (Cl. 176—28)

The invention described herein was made in the course of, or under, a contract with the U.S. Atomic Energy Commission.

The present invention deals with a novel control system for a nuclear reactor. More particularly the invention deals with a control system for a nuclear reactor involving a minimum of mechanical movement to accomplish this control. It also involves a control system with an extremely low probability of mechanical failure which obviously eliminates substantial hazards.

The most common method of control utilizes sliding control rods. This requires a great deal of sliding action in the reactor active zone with complex mechanical actuators. Any swelling of the control rod or the adjacent fuel can jam the control rod and make it inoperative. Mechanical failure is also a hazard in the accessory actuating equipment. Other common methods of control include pivoted control rods and moving reflector, all requiring substantial mechanical movement.

It is well known in the reactor art, that small changes in core volume can cause substantial changes in reactivity, particularly with fast spectrum reactors. This phenomenon is described in U.S. Patent 2,961,393 (H. O. Monson) and in Hazard Summary Report Experimental Breeder Reactor II (EBR II), Report ANL-5719, L. J. Koch et al., May 1957, page 218 ff and related plates.

The present invention consists in varying the angle of inclination of certain of the fuel assemblies of a reactor incorporating a plurality of elongated fuel assemblies with respect to other fuel assemblies to control the reactor. In more detail it consists of rotating the upper portions of the fuel assemblies around a central fuel assembly while holding the lower portions thereof in a fixed position to control the reactor. This may be accomplished by rotating an upper plate through which the upper portions of the fuel assemblies extend about its axis while holding the lower portion of the fuel assemblies in a fixed position. The position of maximum volume and therefor minimum reactivity for such a system is the position at which all fuel assemblies are parallel. Rotation of the upper plate to produce a change in the angle of inclination of the fuel assemblies increases reactivity by bringing fuel assemblies closer together to reduce the volume of the core. This change in volume can easily be demonstrated by rotating the top of one rod around the top of another rod while maintaining the bottom of each rod in a fixed position. The effect of such rotation is to bring the centers of the rods together.

The invention can be applied specifically to a reactor in which the fuel assemblies are arranged in concentric hexagons around a single central axial fuel assembly with the outer fuel assemblies being inclined with respect to the axis of the reactor. In more detail the fuel assemblies are arranged in a skewed cylindrical configuration along the generating lines of concentric hyperboloids of revolution. Such a reactor is known in the art, see, for example, FIGURE 8 of U.S. Patent No. 2,975,117.

Figure 2:
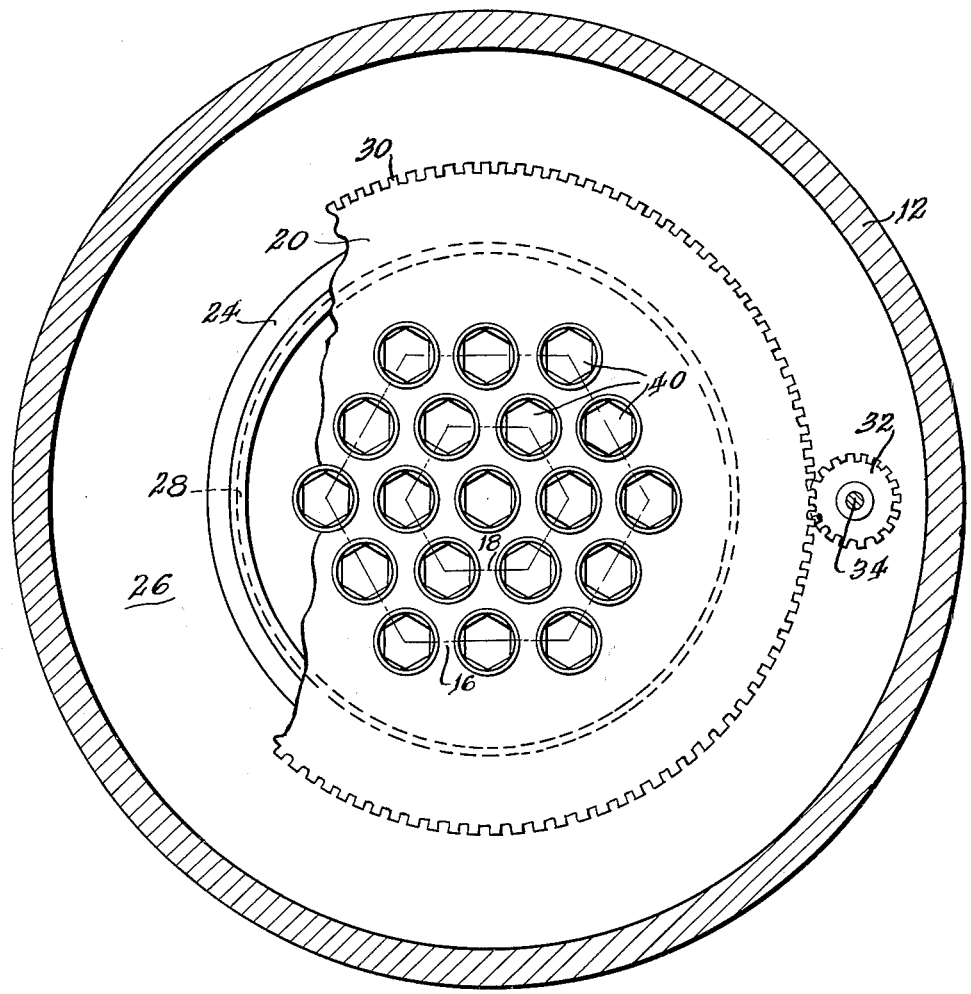
Figure 3:
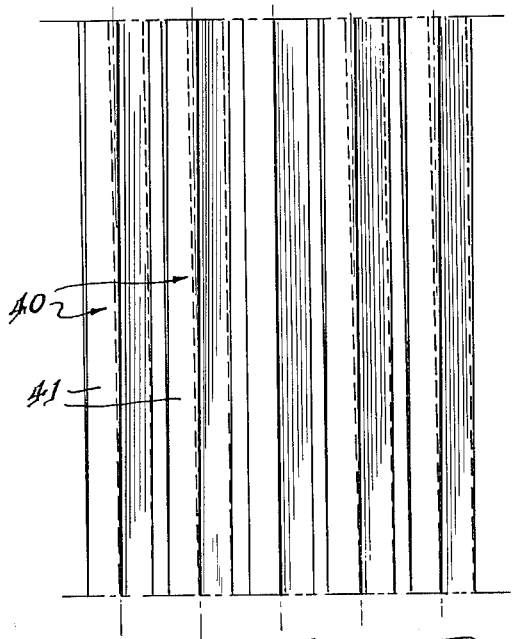
Figure 4:
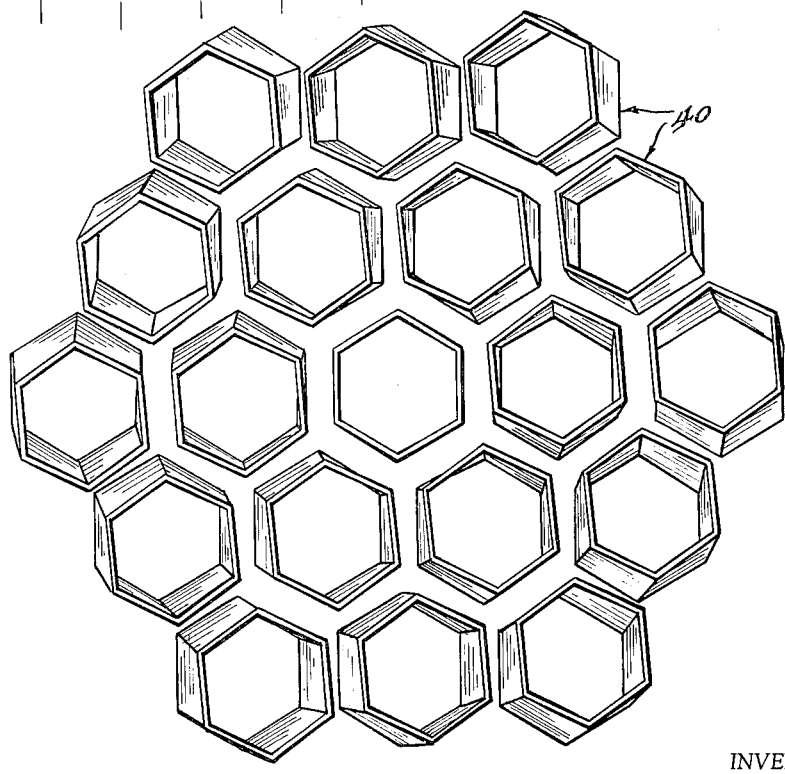

The invention is best understood when described in connection with the drawings. FIGURE 1 is a vertical section along a diametric plane of a reactor designed to utilize this principle. FIGURE 2 is a horizontal section of the reactor taken along lines 2—2 of FIGURE 1. FIGURE 3 is a partial, schematic view of the center row of fuel assemblies, showing the angular disposition relative to the axis of the reactor. FIGURE 4 is a schematic top view of all of the fuel assemblies, showing this angular disposition.

Referring to FIGURES 1 and 2, lower support plate 10 is secured to wall 12 of the reactor vessel. Support plate 10 has a plurality of tapered holes 14 arranged in triangular array to form two hexagons 16 and 18 surrounding a central assembly. Upper support plate 20, has holes 22, positioned in the same pattern as the holes 14 in lower support plate 10.

Support plate 20 is maintained in a central position and given rotational capability by resting on bearing 24, which is supported by annular support 26. Annular support 26, in turn is supported by shell 28, which is firmly secured at its bottom to lower support 10.

At the periphery of support plate 20 are gear teeth 30. Pinion gear 32, mounted on shaft 34 is so positioned as to mesh with gear teeth 30 and cause the rotation of upper support plate 20.

Fuel assemblies 40 have a hexagonal central section 41 blending into an upper cylindrical section 42 and a lower tapered section 44. Cylindrical section 42 is of such size as to fit loosely into the holes 22 in upper support plate 20. Tapered sections 44 rest in the tapered holes 14 in lower support plate 10. Coolant inlet tubes 46 are attached to lower tapered section 44 of the fuel assemblies 40 and have an outer diameter slightly smaller than the smallest diameter of holes 14, so that they can accommodate some shift from the vertical. Also coolant outlet tubes 48 are attached to upper cylindrical section 42.

The fuel rods (not shown) are positioned in hexagonal section 41 of fuel assemblies 40. The size, spacing and number of fuel rods can be varied according to the size and characteristics of the reactor, and are within the skill of the art. Normally for a liquid metal cooled reactor the rods would be about ¼" in diameter, clad with stainless steel, and spirally wrapped with a spacing wire.

Originally the upper plate 20 is rotated by a rotational means (not shown) acting on shaft 34 until the holes 22 are aligned with holes 14 in lower plate 10. Loaded fuel assemblies 40 are then inserted through holes 22 until brought to rest in tapered holes 14. In this position the reactor is not critical. Coolant connections are made, using flexible tubing (not shown), with coolant inlet tubes 46 and coolant outlet tubes 48 and coolant (which may be a liquid metal) is passed through the fuel assemblies 40.

Criticality is obtained by rotation of upper support plate 20, once criticality is attained further rotation of no more than 5° is sufficient to maintain control throughout the life of the reactor.

The relation between reactivity and core volume is $$\frac{\Delta K}{K} = -A\frac{\Delta V}{V}$$

where A can range between 0.1 and 1 depending on the type of reactor, the spacing between support plates and the number of rows of fuel. ΔV is the change in core volume V.

As burnout progresses, criticality can be maintained by slightly more rotation of the upper plate. Control would then resume as before, except that it would be centered about a point of larger skew.

It will be understood that the invention is not to be limited to the details given to the specific embodiment described herein but that it may be modified within the scope of the appended claims. For example, is is applicable to thermal reactors as well as fast reactors. It may be used as a simple means of producing an oscillating reactivity change for reactor physics testing, or as a way of producing controlled bursts of very high flux levels.

What is claimed is:

1. A nuclear reactor comprising a plurality of spaced elongated fuel assemblies disposed around a central axial fuel assembly, means for holding the lower ends of the fuel assemblies relatively immobile, a plate through which the upper portions of the fuel assemblies extend and means for rotating said upper plate.

2. A nuclear reactor comprising a plurality of spaced elongated fuel assemblies disposed around a central axial fuel assembly and means for rotating the upper portions of said spaced fuel assemblies around the central fuel assembly while holding the lower portions thereof in a fixed position to control the reactor.

3. A nuclear reactor according to claim 2 wherein said last named means include peripheral gear teeth on said plate and a pinion gear engaging said teeth.

References Cited by the Examiner

UNITED STATES PATENTS

| | | | |
|---|---|---|---|
| 2,975,117 | 3/1961 | Zinn | 176—18 |
| 3,070,531 | 12/1962 | Huet | 176—21 |
| 3,180,799 | 4/1965 | Blake | 176—21 |

FOREIGN PATENTS

| | | |
|---|---|---|
| 621,190 | 5/1961 | Canada. |
| 1,294,391 | 4/1962 | France. |
| 1,307,044 | 9/1962 | France. |

LEON D. ROSDOL, *Primary Examiner.*

L. DEWAYNE RUTLEDGE, *Examiner.*